United States Patent
Honda et al.

(10) Patent No.: US 8,748,072 B2
(45) Date of Patent: Jun. 10, 2014

(54) METHOD AND APPARATUS FOR PRODUCING TONER

(75) Inventors: Takahiro Honda, Fujinomiya (JP); Yukio Tabata, Mishima (JP); Yohichiroh Watanabe, Fuji (JP); Kazumi Suzuki, Shizuoka (JP); Shinji Ohtani, Shizuoka (JP); Yoshihiro Norikane, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 698 days.

(21) Appl. No.: 12/488,843

(22) Filed: Jun. 22, 2009

(65) Prior Publication Data

US 2009/0317738 A1    Dec. 24, 2009

(30) Foreign Application Priority Data

Jun. 23, 2008  (JP) ................................. 2008-162781
Jun. 24, 2008  (JP) ................................. 2008-164049

(51) Int. Cl.
   *G03G 5/00*      (2006.01)

(52) U.S. Cl.
   USPC .......................................... 430/137.1; 425/6

(58) Field of Classification Search
   USPC ................ 430/137.14, 6, 137.1; 294/9; 425/6
   See application file for complete search history.

(56) References Cited

U.S. PATENT DOCUMENTS

| | | |
|---|---|---|
| 2008/0063971 A1 | 3/2008 | Watanabe et al. |
| 2008/0286679 A1 | 11/2008 | Norikane et al. |
| 2008/0292985 A1 | 11/2008 | Suzuki et al. |
| 2009/0117486 A1 | 5/2009 | Watanabe et al. |

FOREIGN PATENT DOCUMENTS

| | | |
|---|---|---|
| EP | 1 703 332 A2 | 9/2006 |
| EP | 1 715 387 A2 | 10/2006 |
| EP | 1 992 995 A2 | 11/2008 |
| JP | 57-201248 | 12/1982 |
| JP | 7-152202 | 6/1995 |
| JP | 2005-291530 A | 10/2005 |
| JP | 2006-000794 A | 1/2006 |
| JP | 3786034 | 3/2006 |
| JP | 3786035 | 3/2006 |
| JP | 2006-293320 | 10/2006 |
| JP | 2006-307168 A | 11/2006 |
| JP | 2007-199463 A | 8/2007 |

OTHER PUBLICATIONS

Office Action issued Aug. 3, 2012, in Japanese Patent Application No. 2008-164049.
Office Action issued Aug. 21, 2012, in Japanese Patent Application No. 2008-162781.

*Primary Examiner* — Stewart Fraser
(74) *Attorney, Agent, or Firm* — Oblon, Spivak, McClelland, Maier & Neustadt, L.L.P.

(57) ABSTRACT

A method for producing a toner, including ejecting a toner composition liquid containing at least a resin and a colorant periodically from a plurality of nozzles into a chamber using a vibration unit, so as to form droplets in a gas phase; and solidifying the droplets, wherein the droplets are transported by transport air flow selected from at least one of vertical downward air flow and rotational air flow, and the method can prevent toner particles from aggregation.

14 Claims, 10 Drawing Sheets

1

METHOD AND APPARATUS FOR PRODUCING TONER

FIELD OF THE INVENTION

The present invention relates to a method for producing a toner used as a developer for developing a latent electrostatic image in an electrophotography, electrostatic recording, electrostatic printing and the like, and an apparatus for producing a toner which suitably performs the method for producing a toner.

DESCRIPTION OF THE RELATED ART

Conventionally, as a method for producing an electrophotographic toner used for copiers, printers, facsimiles or complex machines thereof on the basis of an electrophotographic recording method, only a pulverization method had been used. However, recently, a so-called polymerization method in which a toner is formed in an aqueous medium is widely used, wherein the toner produced by the polymerization method is a so-called "polymerized toner" or "chemical toner", and the polymerization method is more commonly used than the pulverization method (Japanese Patent Application Laid-Open (JP-A) No. 07-152202). The polymerization method includes a production method without performing polymerization process for the sake of convenience. Examples of such polymerization methods in practical use include a suspension polymerization method, an emulsion polymerization method, a polymer suspension (polymer aggregation) method, and ester elongation method.

The polymerization method has an advantage of obtaining a toner having a small particle diameter with ease, a sharp particle size distribution and a substantially spherical shape, compared to the pulverization method. On the other hand, it also has a disadvantage of being inefficient because toner particles are desolvented in a solvent, typically water. Moreover, the polymerization process needs long time, and toner particles are solidified and separated from the solvent, and then repeatedly washed and dried. The process needs a long time, and a large amount of water and energy.

A spray dry method which has been known as a method in which a melt formed by dissolving a toner composition in an organic solvent, or a liquid formed by dissolving and dispersing a toner composition in an organic solvent is microparticulated using various atomizers so as to be ejected (JP-A No. 57-201248, Japanese Patent (JP-B) Nos. 3786034 and 3786035).

However, a method disclosed in JP-B Nos. 3786034 and 3786035 is not the spray dry method, but a method of ejecting droplets corresponding to a nozzle diameter from a plurality of nozzles. It has been inevitable that particle size distribution becomes broad due to aggregation of droplets, and the method does not satisfy monodispersibility of the resulted particles. A method for producing a toner disclosed in JP-A No. 57-201248 is a spray dry method that a toner material in a melting state is sprayed, and differs from the method disclosed in JP-B Nos. 3786034 and 3786035.

A method disclosed in JP-A No. 2006-293320 is that a toner composition containing a resin and a colorant and having fluidity is vibrated at a constant frequency so as to be ejected from a nozzle, thereby forming a minute droplet, and that the minute droplet is dried and solidified to from a toner particle.

The method disclosed in JP-A No. 2006-293320 has been proposed so as to solve the above-described problems disclosed in JP-B Nos. 3786034 and 3786035 by the inventors of the present invention, and enables to produce a toner with extremely high production efficiency and at energy saving because it is not necessary to use a large amount of cleaning liquid and to repeatedly separate a solvent and particles. Moreover, the time required for producing a toner can be far shorter than a polymerized toner. The method for producing a toner by jet-pulverizing disclosed in JP-A No. 2006-293320 is a method that a toner composition liquid, which is obtained by dissolving or dispersing a toner material containing at least a binder resin and a pigment in a solvent, is jetted from a head having a plurality of pores provided in a part of a container for containing the toner composition liquid, so as to form droplets, and that the jetted droplets are solidified and dried so as to obtain a toner. The jetted droplet at a certain initial velocity is decelerated at an accelerating rate by viscosity resistance of gas in a chamber, and if a direction of droplet flow is up-down, the droplet falls down at a constant velocity, i.e. free fall velocity at the point where the viscosity resistance and the gravity are counterbalanced.

This is specifically explained with reference to FIG. 6. FIG. 6 is a schematic view of a droplet jetting unit of a conventional apparatus for producing a toner. A droplet jetting unit 2 is equipped with a droplet forming unit 11 having a metal thin film 16 in which a plurality of nozzles 15 are formed, and a vibration unit 17 for vibrating the thin film 16, such as a piezoelectric element. On the thin film 16, a reservoir 12 for a toner composition liquid 10 obtained by dissolving or dispersing a toner material containing at least a binder resin and a colorant in a solvent, and a container 13 having a supply channel 14 for supplying the reservoir 12 with the toner composition liquid 10 are arranged. The container 13 is formed in the upper part of the chamber 18 including a particle forming unit 3 for forming a toner particle by drying and solidifying a droplet formed of the toner composition liquid ejected from the droplet jetting unit 2. Then the thin film 16 vibrates according to the vibration of the vibration unit 17 so as to jet the toner composition liquid 10 from the reservoir 12 through the nozzles 15 in the form of droplets 23. The jetted droplets 23 at a large initial velocity $v_0$ are decelerated at an accelerating rate by viscosity resistance of surrounding gas, and finally the velocity thereof is counterbalanced at free fall velocity $v_g$. As the free fall velocity (equilibrium velocity) $v_g$ is far slower than the initial velocity $v_0$, droplets may possibly aggregate each other, for example, aggregation of two droplets 23 (FIG. 7A) or aggregation of three droplets 23 (FIG. 7B), while dried and solidified with falling. When all droplets have the same particle diameter and fall down at the same equilibrium velocity, they do not aggregate. In fact, there are variations in the particle diameter and equilibrium velocity, and velocity difference in a horizontal direction, thus the droplets aggregate.

The particle size distribution of the toner particles produced by the above-described method is actually examined, and double, triple, quadruple, or more droplets, which may be formed by aggregation of droplets at an equilibrium velocity, and a broad particle size distribution are observed, as it stands (FIG. 8). When the particle size distribution is broad, the charge amount distribution of the toner becomes broad, decreasing uniformity and sharpness of the resulted image. Although the droplets 23 are dried, i.e. the particle diameter thereof becomes smaller while falling down in the chamber 18, the droplets still aggregate. Thus, it is considered that the droplets are not completely dried at the point where the droplets fall down at the equilibrium velocity.

BRIEF SUMMARY OF THE INVENTION

The present invention solves the above-described conventional problems, and aimed to provide a method for producing a toner and an apparatus for producing a toner, which can prevent toner particles from aggregation and stably produce a toner having a uniform particle size.

The means for solving the aforementioned problems are as follows:

<1> A method for producing a toner, including: ejecting a toner composition liquid containing at least a resin and a colorant periodically from a plurality of nozzles into a chamber using a vibration unit, so as to form droplets in a gas phase; and solidifying the droplets, wherein the droplets are transported by transport air flow selected from at least one of vertical downward air flow and rotational air flow.

<2> The method for producing a toner according to <1>, wherein the vertical downward air flow has a flow velocity larger than the free fall velocity of the droplets, upon jetting the toner composition liquid from the nozzles so as to form the droplets.

<3> The method for producing a toner according to <1>, wherein the rotational air flow contains a component orthogonal to a direction of gravity in any position of the air flow direction.

<4> The method for producing a toner according to <3>, wherein the flow velocity of the rotational air flow is larger than the terminal velocity of the droplets, which is calculated by Equation (1):

$$\text{Terminal velocity} = [\{4g \cdot Dp \cdot (\rho p - \rho f)\}/(3\rho f \cdot Cr)]^{1/2} \quad \text{Equation (1)}$$

where "g" represents an acceleration of gravity, Dp represents a particle diameter of a droplet, ρp represents a density of gas, ρf represents a density of the droplet, and Cr represents a coefficient of resistance which is a dimensionless number.

<5> The method for producing a toner according to any one of <1> to <4>, wherein the transport air flow is obtained by flowing gas in a shroud arranged covering the nozzles.

<6> The method for producing a toner according to <5>, wherein the transport air flow is obtained by blowing the gas off from the upper part of the shroud.

<7> The method for producing a toner according to any one of <1> to <6>, wherein the transport air flow is generated by suctioning the gas using a suction unit arranged in the lower part of the chamber.

<8> The method for producing a toner according to any one of <2> to <7>, wherein the vertical downward air flow is laminar flow.

<9> The method for producing a toner according to any one of <3> to <7>, wherein the rotational air flow is obtained by generating air flow in a tangential direction with respect to an inner wall of the shroud.

<10> An apparatus for producing a toner, including: a droplet forming unit configured to jet a toner composition liquid containing at least a resin and a colorant from a plurality of nozzles, which is vibrated at a constant frequency, into a chamber so as to form droplets; a toner particle forming unit configured to dry the droplets by removing a solvent therein so as to form toner particles; and a shroud configured to form transport air flow for transporting the droplets formed of the toner composition liquid flowing along a direction of ejecting the toner composition liquid from the nozzles, and the transport air flow is selected from at least one of vertical downward air flow and rotational air flow.

<11> The apparatus for producing a toner according to <10>, further including a vertical downward air flow generating unit configured to generate the vertical downward air flow with respect to the ejected droplets, wherein the vertical downward air flow has a flow velocity larger than the free fall velocity of the droplets.

<12> The apparatus for producing a toner according to <10>, further including a rotational air flow generating unit configured to generate the rotational air flow with respect to the ejected droplets, wherein the rotational air flow contains a component orthogonal to a direction of gravity in any position of the air flow direction.

<13> The apparatus for producing a toner according to any one of <10> to <12>, wherein the shroud has an opening in a position corresponding to the nozzles, and the cross-sectional opening has a taper of which diameter increases outwardly.

According to the present invention, a method and apparatus for producing a toner, which can prevent aggregation of toner particles and stably produce a toner having a uniform particle size, can be provided.

DETAILED DESCRIPTION OF THE INVENTION

Figure 1:
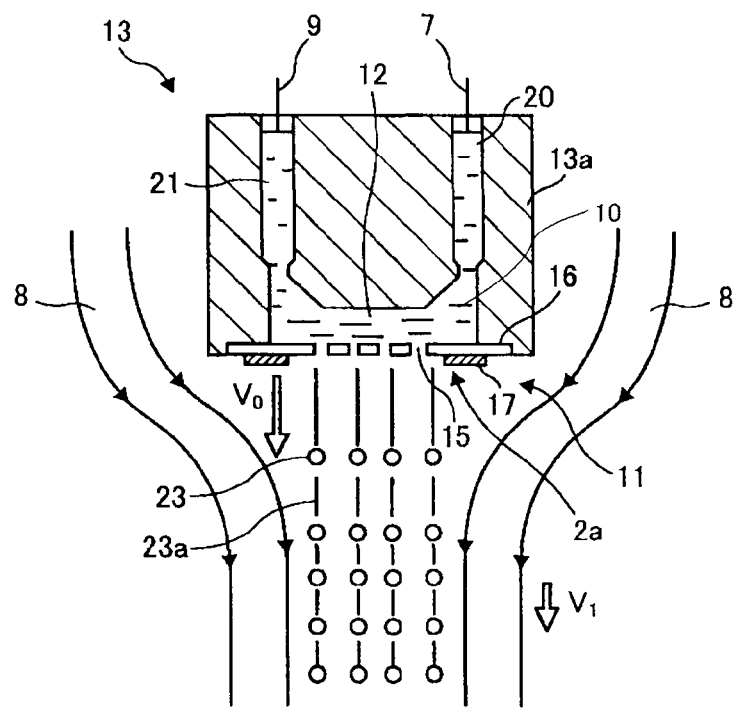
FIG. 1 is a schematic diagram showing a principle of a method for producing a toner using vertical downward air flow as transport air flow.

Firstly, in the case of using vertical downward air flow as transport air flow, an outline of a method and an apparatus for producing a toner of the first embodiment of the present invention will be explained. Inventors of the present invention have been studied on aggregation of droplets (hereinafter, also referred to as toner droplets) of a toner composition liquid during production of toner particles, and focused attention on that when the droplets of toner composition liquid are dried while falling down, the droplets fall at a free fall velocity before dried and solidified, and that droplets easily aggregate at the free fall velocity. Thus, the aggregation of droplets can be suppressed by preventing the droplets from falling down at the free fall velocity before they are dried and solidified.

On the basis of the consideration, the inventors of the present invention have further studied, and found that when a toner composition liquid is formed into droplets and ejected from nozzles, the aggregation of droplets can be suppressed by transporting the droplets by vertical downward air flow, as transport air flow, which has a flow rate larger than the free fall velocity of the droplets, thereby achieving the method and apparatus for producing a toner of the present invention.

According to the first embodiment of the present invention, the toner aggregation can be prevented by transporting the droplets which are entrained in transport air flow having a flow rate larger than the free fall velocity of the droplets in a method in which a solution and/or dispersion obtained by dissolving or dispersing a toner material containing at least a binder resin and a pigment in a solvent is jetted in the form of droplets from a head having a plurality of pores provided in a part of a container for containing the solution and/or dispersion, and then the jetted droplets are dried and solidified to obtain a toner. It is more preferred that a chamber for housing the jetted droplets is provided, and that a shroud for covering an area other than a plurality of pores is provided outside a container for containing a solution and/or dispersion, wherein the transport air flow is obtained by flowing gas in the shroud.

Next, in the case of using rotational air flow as transport air flow, an outline of a method and apparatus for producing a toner of the second embodiment of the present invention will be explained.

As in a method and apparatus for producing a toner of the second embodiment of the present invention, when a toner is produced in such a manner that the toner droplets jetted from a head portion are entrained in rotational air flow, the particle size distribution of the toner becomes sharp, compared to a toner obtained by a conventional toner production method in which the toner droplets are fallen down in a vertical direction, which will be described later as a result of Comparative Example.

The reasons for this may be as follows.

When a toner is produced by a conventional jet pulverization, the toner droplets are jetted vertically downward. Therefore, both a toner droplet falling down at high velocity with slow deceleration and a toner droplet falling down at low velocity with fast deceleration take the same track. Thus, when a toner droplet jetted later falls down faster than that jetted earlier, the toner droplet jetted later catches up with that jetted earlier both of which take the same track, and then the toner droplets aggregate.

On the other hand, in the case where the jetted toner droplets are entrained in rotational air flow containing a component orthogonal to a direction of gravity in any position of the air flow direction, when the particle diameters and shapes of the toner droplets vary, the velocity changes and influence from the gravity are varied depending on how viscous resistance of the gas affects the droplets of different sizes and shapes, and thus the toner droplet falling down with slow deceleration and the toner droplet falling down with fast deceleration take different tracks. Therefore, the toner droplet jetted later falling down at high velocity with slow deceleration is not easily brought into contact with the toner droplet jetted earlier.

Moreover, as each of the jetted toner droplets falls down while entrained in rotational air flow, and moves with the surrounding gas, the viscous resistance of the gas against the toner droplets is decreased, reducing deceleration. Thus, the droplet jetted later is hard to catch up with the droplet jetted earlier, and the droplet jetted later is not easily brought into contact with the droplet jetted earlier.

When a toner droplet falls down vertically just like a toner produced by a conventional jet pulverization method, all toner droplets move vertically downward, so that a moving direction of the droplet jetted later becomes a direction of the droplet jetted earlier which is caught up with the droplet jetted later. Thus, when the droplet jetted later catches up with and is brought into contact with the droplet jetted earlier, a force is applied to the droplet jetted later in a direction where the toner droplets aggregate. Thus, the toner droplets easily aggregate.

On the other hand, in the case where toner droplets are entrained in rotational air flow containing a component orthogonal to a direction of gravity in any position of the air flow direction, the velocity change of the jetted toner droplets needs to be the same in order that the jetted toner droplets fall down in the same track. Because the rotational air flow is air flow containing a component orthogonal to a direction of gravity in any position of the air flow direction, i.e. a component of the horizontal direction, in the case where the velocity change of the toner droplets are different, a balance between a velocity of movement in a gravity direction by gravity and a velocity of movement in a horizontal direction by a component of the horizontal direction of air flow is different depending on the rate of the velocity change of the toner droplet, and the jetted toner droplets take different tracks. In the case where the velocity change of the jetted toner droplets are the same, although the toner droplets take the same track, the toner droplet jetted earlier never be caught up with the toner droplet jetted later. Therefore, the toner droplets are brought into contact with each other because they fall down in the different tracks due to variations in velocity change. In the state where one toner droplet is in contact with another toner droplet, the moving direction of the one toner droplet is not the same as a direction where another toner droplet is positioned in most cases. Thus, even if the toner droplets are brought into contact with each other, they do not easily aggregate, compared to the conventional configuration in which the toner droplets fall down vertically.

When the rotational air flow is used as transport air flow, the jetted toner droplets are not easily brought into contact with each other, and they do not easily aggregate, even when they are in contact with each other. Therefore, the toner droplets are prevented from aggregation during production of a toner, and the toner has a sharp particle size distribution.

In this way, the method and apparatus for producing a toner using the rotational air flow as transport air flow enables to prevent the toner droplets from aggregation during production of a toner, and to produce the toner having a sharp particle size distribution.

Figure 2:
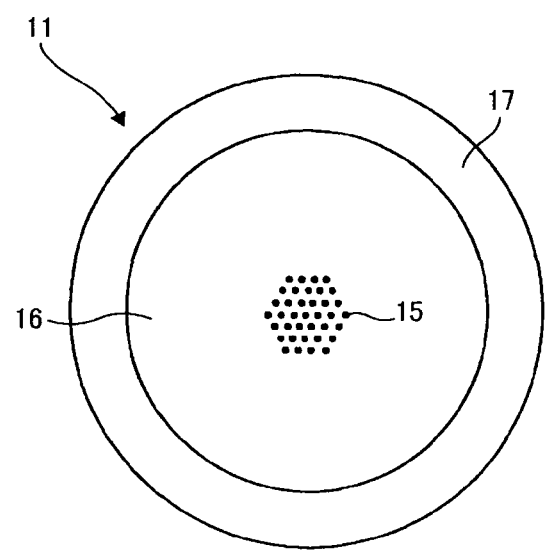
FIG. 2 is a plane view showing an example of a droplet forming unit used in the method for producing a toner of the present invention.

FIG. 1 shows a main part of an apparatus for producing a toner by using vertical downward air flow as transport air flow in the first embodiment of the present invention. With reference to FIG. 1, an operation of the apparatus of the present invention will be explained. A solution and/or dispersion obtained by dissolving or dispersing a toner material containing at least a binder resin and a pigment in a solvent (toner composition liquid) 10 is contained in a container 13. The container 13 constitutes a droplet jetting unit 2, in which a cylindrical member 13a is counter bored in a circular shape so as to form a chamber. In the member 13a, a liquid supply hole 20 and a liquid discharge hole 21 are formed, which are respectively connected with pipes 7 and 9 so as to be supplied with and discharge the toner composition liquid 10. The droplet jetting unit 2 is composed of the container 13 which is composed of the member 13a, the liquid supply hole 20 and the liquid discharge hole 21. On the bottom face of the member 13a, a thin film 16 is arranged so as to constitute a bottom part of the container 13. As shown in FIG. 2, in the central portion of the thin film 16 a plurality of nozzles 15 which pass through this film are provided. A head 2a of the droplet jetting unit 2 is composed of the thin film 16 in which a plurality of nozzles 15 are provided, an annular vibration unit 17 concentrically arranged on the outer surface of the thin film 16, and the container 13.

Figure 3:
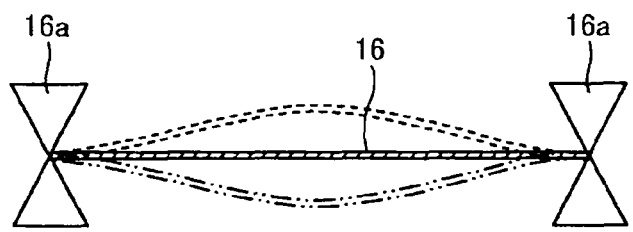
FIG. 3 is a cross-sectional view showing a vibrating state of a droplet forming unit used in the method for producing a toner of the present invention.
Figure 4A:
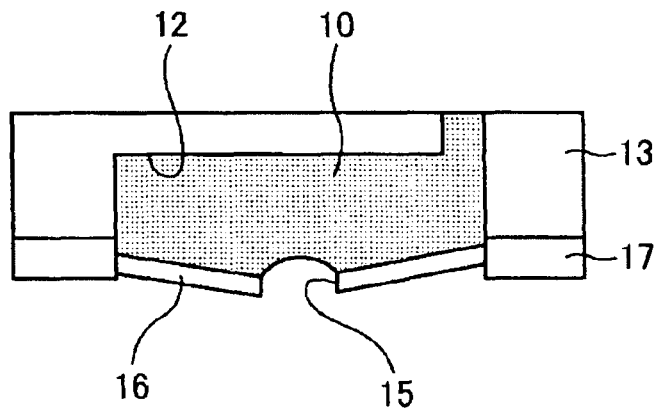
FIG. 4A is a cross-sectional view showing a droplet forming state by the use of a droplet jetting unit used in the method for producing a toner of the present invention, wherein a thin film is deflected outwardly.
Figure 4B:
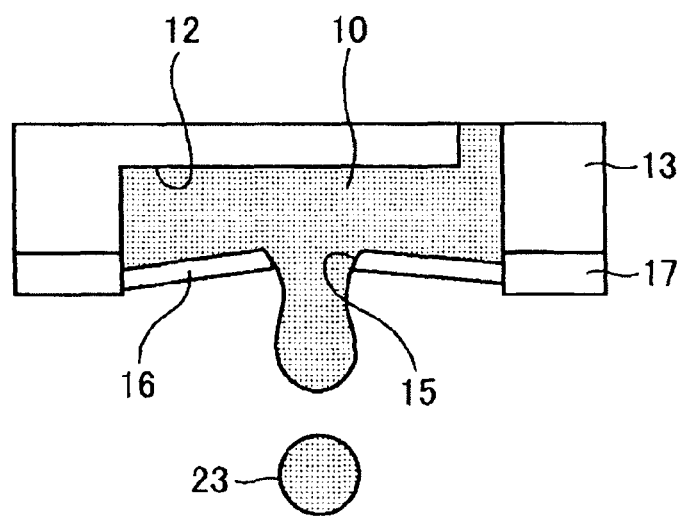
FIG. 4B is a cross-sectional view showing a droplet forming state by the use of a droplet jetting unit used in the method for producing a toner of the present invention, wherein a thin film is deflected inwardly so as to form a droplet.

By a driving device (not shown), a voltage is applied to the annular vibration unit 17 so as to vibrate. The thin film 16 vibrates by the vibration of the vibration unit 17. As shown in FIG. 2, the annular vibration unit 17 is arranged on the outer periphery of the thin film 16, in which a plurality of nozzles are provided in the central portion, and by the vibration of the vibration unit 17 the thin film 16 vibrates while the thin film 16 is deformed so as to depress the central portion thereof in a state where the outer periphery 16a of the thin film 16 is fixed as shown in FIG. 3. As a result, as shown in FIGS. 4A and 4B, a toner composition liquid 10 stored in a reservoir 12 is ejected from a nozzle 15 in the form of droplets 23. The initial velocity of the droplet 23 is defined as "$v_0$". The jetted droplets 23 form flow 23a including the droplets 23. Around the flow 23a, transport air flow 8 flows, and the flow velocity of the transport air flow 8 in a position after the droplet is jetted is defined as "$v_1$".

If the transport air flow is not used, as described above and shown in FIG. 6, the velocity of the droplet is decreased by the viscosity of gas such as the air surrounding the droplet, and counterbalanced at free fall velocity, occurring aggregation of droplets. "$v_1$" is larger than the free fall velocity, and set large enough to keep a droplet away from other droplets in view of the variations of particle diameters and initial velocities of the droplets. The flow of the droplets 23 is corrected, once the droplets 23 are entrained in the transport air flow 8. As a result, the droplets flow downward at a velocity equal to that of the transport air flow 8. The thus jetted droplets 23 are dried and collected without forming aggregation. FIG. 1 shows a case where the flow velocity of the transport air flow "$v_1$" is smaller than the initial velocity "$v_0$". However, the flow velocity of the transport air flow "$v_1$" is preferably larger than the initial velocity "$v_0$" in view of preventing the droplets from aggregation.

In this way, the production of a toner in which toner particles having a uniform particle size are stably produced while suppressing the aggregation of the toner particles.

The vibration unit 17 is not particularly limited as long as it can surely apply vibration at a constant frequency. For example, a bimorph piezoelectric element capable of exciting flexural vibration is preferable. Examples of the piezoelectric elements include piezoelectric ceramics such as lead zirconium titanate (PZT). PZT is used in a laminated state because it produces a small amount of deflection. Additionally, examples of the piezoelectric elements include piezoelectric polymers such as polyvinylidene fluoride (PVDF); crystals; and single crystals such as $LiNbO_3$, $LiTaO_3$ and $KNbO_3$.

The vibrational frequency of the vibration unit 17 is preferably 20 kHz or more to less than 2.0 MHz, and more preferably 50 kHz to 500 kHz. When the vibrational frequency is less than 20 kHz, it is hard to accelerate dispersion of fine particles of colorant, wax and the like in the toner composition liquid 10 by applying vibration thereto. When the vibrational frequency is more than 2.0 MHz or more, it is difficult to stably form droplets.

The thin film 16 is a metal thin film having a thickness of 5 μm to 500 μm, and a plurality of nozzles 15 preferably have the same pore diameters in a range of 3 μm to 35 μm. The number of nozzles 15 is preferably 50 to 3,000.

The transport air flow 8 is preferably air flow formed with gas supplied through the shroud arranged in the outer periphery of the container 13, as described later. Alternatively, the transport air flow 8 may be air flow formed by a suction unit arranged at the bottom side of the container. In this case, the air flow is preferably laminar flow so that the air flow impairs the flow of the droplets 23 as little as possible.

Next, an apparatus for producing a toner of the first embodiment of the present invention will be explained with reference to FIG. 5. FIG. 5 is a configuration diagram showing a schematic configuration of the apparatus for producing a toner according to the first embodiment of the present invention.

As shown in FIG. 5, an apparatus 1 for producing a toner includes a droplet jetting unit 2 including a droplet forming unit 11 and a reservoir 12, a chamber 18 which is located under the droplet jetting unit 2 and includes a particle forming unit 3 for forming toner particles by solidifying the droplets of the toner composition liquid ejected from the droplet jetting unit 2, a horn-shaped toner collecting part 4 for collecting the toner particles formed in the particle forming unit 3, a toner reservoir 5 for storing the collected toner, a material housing unit 6 for housing and feeding the toner composition liquid 10 in a direction of arrow A, a pump 200, and a pipe 7 for supplying the droplet jetting unit 2 with the toner composition liquid 10 housed in the material housing unit 6.

This droplet jetting unit 2 is equipped with the droplet forming unit 11 for forming the toner composition liquid 10, which is obtained by dispersing and/or dissolving a toner composition containing at least a resin and a colorant in an organic solvent, into droplets and then ejecting the droplets, and the container 13 in which the reservoir (flow passage) 12 for supplying the droplet forming unit 11 with the toner composition liquid 10 is formed.

The droplet forming unit 11 is composed of a thin film 16 arranged on the container 13 in which a plurality of nozzles (ejection ports) 15 are formed facing the reservoir 12, and an annular vibration unit (mechanical vibration unit) 17 arranged circumference of the thin film 16 so as to vibrate the thin film 16. The circumferential portion of the thin film 16 is connected to the container 13 by soldering or with a resin binder material insoluble in the toner composition liquid 10 so as to be fixed. The annular vibration unit 17 is also connected to the thin film 16 by soldering or with a resin binder material insoluble in the toner composition liquid 10 so as to be fixed. A drive voltage is applied from a drive circuit (not shown) to the vibration unit 17 via a lead wire or the like.

It is preferable that the thin film 16 be formed of a metal plate having a thickness of 5 μm to 500 μm, in which the nozzle pores 15 have a diameter of 3 μm to 35 μm, as shown in FIG. 2. The number of nozzle pore 15 is preferably from 50 to 3,000. The vibration unit 17 is not particularly limited as long as it can surely apply vibration to the thin film 16 at a constant frequency. For example, a bimorph piezoelectric element capable of exciting flexural vibration is preferable. Examples of the piezoelectric elements include piezoelectric ceramics such as lead zirconium titanate (PZT). PZT is used in a laminated state because it produces a small amount of deflection.

The liquid supply hole 20 for supplying the reservoir 12 with the toner composition liquid 10, and the liquid discharge hole 21 are respectively connected to at least a point of the container 13. A mechanism of formation of droplets by the droplet forming unit 11 is that each of the droplets 23 is ejected from the nozzles 15 in such a manner as explained with reference to FIGS. 2 to 4B.

Then, in the outer periphery of the container 13, the shroud 30 having an opening 30a which faces the nozzles 15 is arranged, which forms a flow passage for gas which transports the droplets 23 flowing along an ejection direction of the toner composition liquid 10 from the nozzles 15. The shroud 30 is formed of pot-shaped double walls 30b, 30c, which are connected together with a lid 31. In the side surface of the shroud 30, a blowoff pipe 91 for blowing gas off is airtightly inserted. Of the double walls, the inner wall 30c extends to near the lower end of the container 13, and the outer wall 30b has inwardly rounded shape and extends to the position under the nozzles 15 so as to have the circular opening 30a which faces the nozzles 15. The diameter of the opening 30a is represented by "D". The inner surface of a bottom 30d of the outer wall 30b and the lower end of the nozzles 15 maintain a clearance "G". The size of G is smaller than that of D. Thus, G is a main factor for deciding the flow velocity of the transport air flow 8.

Figure 5:
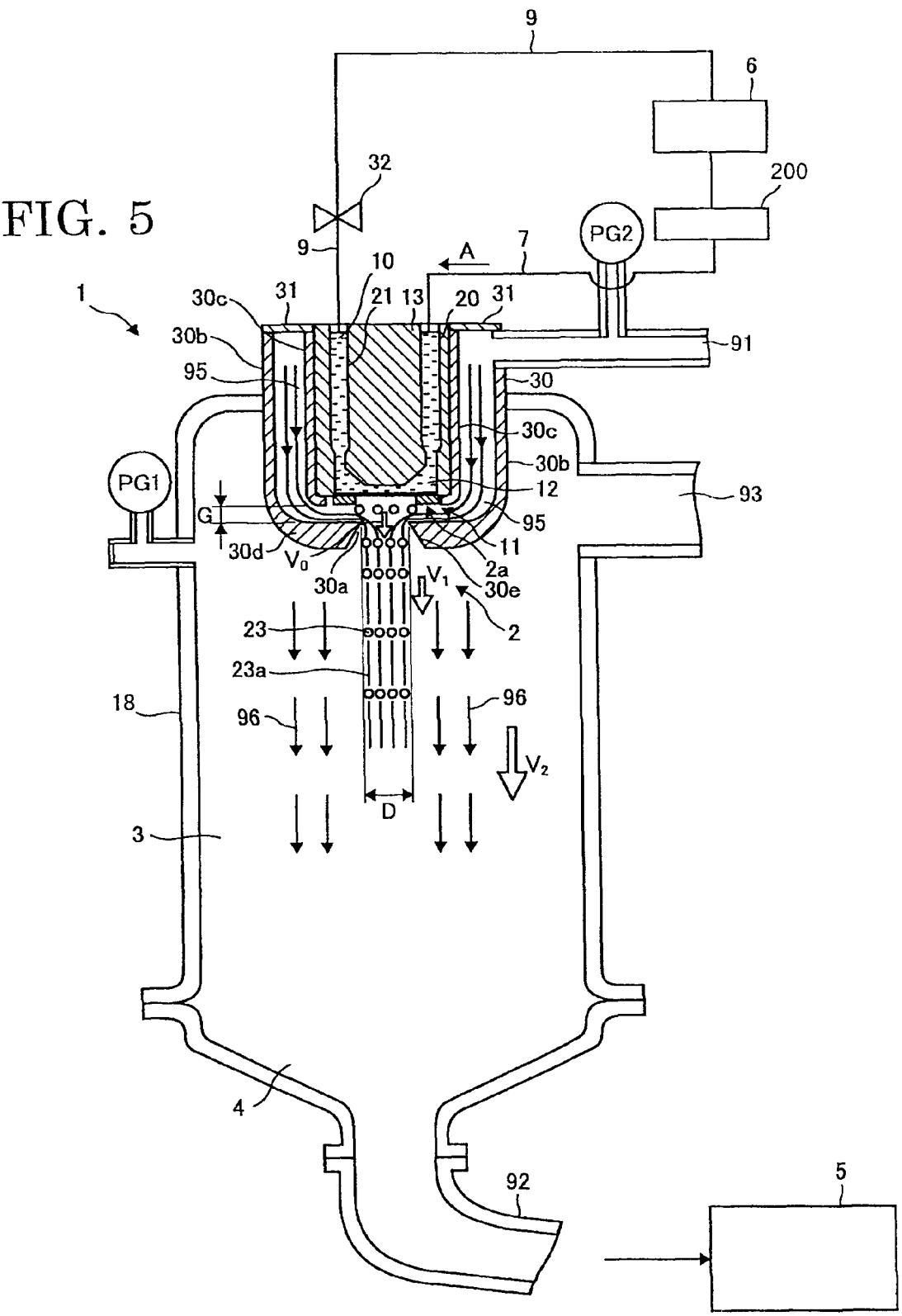
FIG. 5 is a configuration diagram showing a schematic configuration of an apparatus for producing a toner according to an embodiment using vertical downward air flow as transport air flow.

As shown in FIG. 5, in the container 13 as described above with reference to FIG. 1, the liquid discharge hole 21 is connected to the pipe 9, and further connected to a valve 32 for controlling the flow of the toner composition liquid 10. The valve 32 is further connected to the material housing unit 6 through the pipe 9. The material housing unit 6 is connected to a pump 200, and further connected to the liquid supply hole 20 through the pipe 7, thereby forming the circulation path of the toner composition liquid 10. Upon jetting (ejecting) the toner composition liquid 10, the toner composition liquid 10 is jetted while circularly flowed with the valve 32 opened, or the toner composition liquid 10 is jetted under resting condition with the valve 32 closed. When the toner composition liquid 10 in the reservoir 12 of the container 13 is used up under resting condition, the valve 32 is opened to fill the toner composition liquid 10 therein.

Next, the flow 23a of the droplets 23 is guided in the chamber 18 having a large capacity, on which the shroud 30 and the container 13 are arranged. In FIG. 5, in the chamber 18, air flow 96 which is uniform downward laminar flow is formed by blowing gas from a blowoff pipe 93 in the chamber described later. The flow 23a of the droplets 23 is entrained in the air flow 96 and are transported to the guide pipe 92 connected with the toner collecting part 4 located at the bottom while droplets 23 are dried and solidified. The guide pipe 92 is connected to a cyclone (not shown), in which the droplets are collected while further dried, and then transported to the toner reservoir 5. In the upper part of the side surface of the shroud 30, a blowoff pipe 91 for blowing gas off is airtightly inserted. On the other side surface of the chamber 18, a pressure gage PG1 is inserted. Moreover, a pressure gage PG2 is inserted in a side surface of the blowoff pipe 91 of the shroud 30.

Next, the operation of the apparatus for producing a toner of the present embodiment will be explained. In the present embodiment, the toner composition liquid 10 is circulated. When the toner composition liquid 10 is contained in the container 13 with an appropriate pressure, the annular vibration unit 17 serving as a vibration unit is driven by a driving device (not shown) so as to vibrate at 100 kHz, and the vibration is transmitted to the thin film 16, and then the toner composition liquid 10 is ejected in the form of droplets 23 from each of a plurality of nozzles 15, as shown in FIGS. 3, 4A and 4B. The ejection frequency is identical with the vibration frequency. The initial velocity $v_0$ upon ejection is likely to be decreased by viscous resistance of gas in the shroud 30.

On the other hand, gas is blown off in the shroud 30 from the blowoff pipe 91, through which the gas is formed into the transport air flow 95, and discharged from the opening 30a to the chamber 18. The transport air flow 95 is, as shown in FIG. 5, air flow is generated uniformly downwardly in a circumferential direction, and then changed to flow smoothly in a lateral direction at the rounded lower end of the wall 30b of the shroud 30. Then the transport air flow 95 travelled through the shroud 30 is merged together under the nozzles 15 and is discharged from the opening 30a. The air flow of this stage is preferably laminar flow. Turbulent flow may easily cause the aggregation of droplets 23.

Here, the laminar flow 96 as shown in FIG. 5 is realized and the ejected droplets 23 are not decelerated and entrained in the transport air flow 95, and then ejected from the opening 30a into the chamber 18. Further, the droplets 23 are entrained in the laminar air flow 96 and transported to the toner collecting part 4 without forming aggregation.

In this embodiment, the flow velocity $v_1$ of the transport air flow 95 is larger than the initial velocity $v_0$ of the droplet 23, and the droplet 23 is accelerated and then transported while entrained in the transport air flow 95. In the chamber, the flow velocity $v_2$ of air flow 96 larger than the flow velocity $v_1$ is formed. The larger the flow velocity $v_2$ of the air flow 96 is, the more preferably the aggregation of droplets is prevented. The air flow 96 in the chamber 18 is uniformly formed in a circumferential direction by blowing gas off from the blowoff pipe 91, just like in the shroud 30. In the chamber 18 laminar flow is preferable. In order to smoothly flow the flow 23a (having a flow velocity $v_1$) of the droplets including the droplets 23 ejected in the chamber 18 without generating turbulent flow, the flow velocity $v_1$ of the transport air flow 95 and the flow velocity $v_2$ of the air flow 96 in the chamber 18 preferably satisfy the relation: $v_2 \geq v_1$.

The transport air flow 95 in the shroud 30 and the flow velocity of the air flow 96 in the chamber 18 are controlled by the pressure gauges PG2 and PG1. The pressure P1 in the shroud 30 and the pressure P2 in the chamber 18 preferably satisfy the relation: $P1 \geq P2$. If this relation is not maintained, the droplets 23 may possibly flow back. In FIG. 5, the reference numeral 93 represents a blowoff pipe for blowing gas to the chamber 18.

As described above, a rate limiting factor for determining the flow velocity of the transport air flow 95 in the shroud 30 is the clearance G between the wall 30b and the head 2a, because of the condition D>G.

In this way, both the transport air flow 95 in the shroud 30 and the air flow 96 in the chamber 18 are respectively formed by blowing gas from the blowoff pipe 91 located above the chamber 18, and from the blowoff pipe 93 located in the chamber 18. However, air flow can be formed by suctioning the internal air from the pipe 92 arranged at the bottom of the chamber 18.

The cross-section of the diameter of the opening 30a of the wall 30b of the shroud 30 increases along the direction for discharging gas. That is, a taper 30e is arranged so that its diameter increases with distance from the opening 30a. The taper 30e formed in the opening 30a can prevent the droplets 23 from being in contact with and adhering to the surface of the opening 30a, when the droplets 23 pass through the opening 30a.

The size of the main part of the apparatus for producing a toner of the present embodiment is as follows:

The container 13 has a diameter of 23 mm and a height of 10 mm. The liquid supply hole 20 and the liquid discharge hole 21 have a height of 54 mm. The pipes 7 and 9 have a diameter of 4 mm. The thin film 16 is a nickel plate and has a diameter of 12 mm and a thickness of 20 µm. The nozzle 15 has a diameter of 10 µm and 800 nozzles are formed in a central area having a diameter of 5 mm of the thin film 16. The shroud 30 has an inner wall 30c having a diameter of 22 mm, an outer wall 30b having a diameter of 36 mm and a height of 55 mm. The clearance G is 3 mm, and the opening 30a has a diameter of 9 mm. The blowoff pipe 91 of the shroud 30 has a diameter of 6 mm. The chamber 18 has an inner diameter of 74 mm and a height of 160 mm. The blowoff pipe 93 of the chamber 18 has a diameter of 12 mm. In the apparatus, the amount of gas blowing in the chamber 18 is 1.5 g/min. The shroud 30 has a pressure P1 of 40 kPa and the chamber 18 has a pressure P2 of 15 kPa. The flow velocities $v_0$ and $v_1$ are respectively 8 m/s and 26 m/s. The temperature inside the chamber 18 is 27° C. to 28° C. The free fall velocity is 2 mm/s to 10 mm/s. The fall velocity of the droplets is substantially the same as the flow velocity $v_1$. It is understood that the flow velocities $v_0$ and $v_1$ are drastically larger than the free fall velocity. These velocities can be measured in such a manner that a scale for measuring a length is set in the background part of the flow 23a of the droplets 23 ejected from the droplet forming unit 11, and then the droplets 23 are photographed with a high speed camera and recorded.

In the present embodiment, as the gas to be blown, nitrogen gas is used in the shroud 30 and the chamber 18. Air may also be used. In FIG. 5, the shroud 30 is composed of pot-shaped double walls. The outer wall of the container 13 may also serve as the inner wall 30c. In one chamber 18, a plurality of the droplet jetting units 2 and the shrouds 30 may be juxtaposed so as to further improve toner production efficiency.

Hereinafter, the second embodiment of an apparatus for producing a toner of the present invention will be explained.

Figure 9:
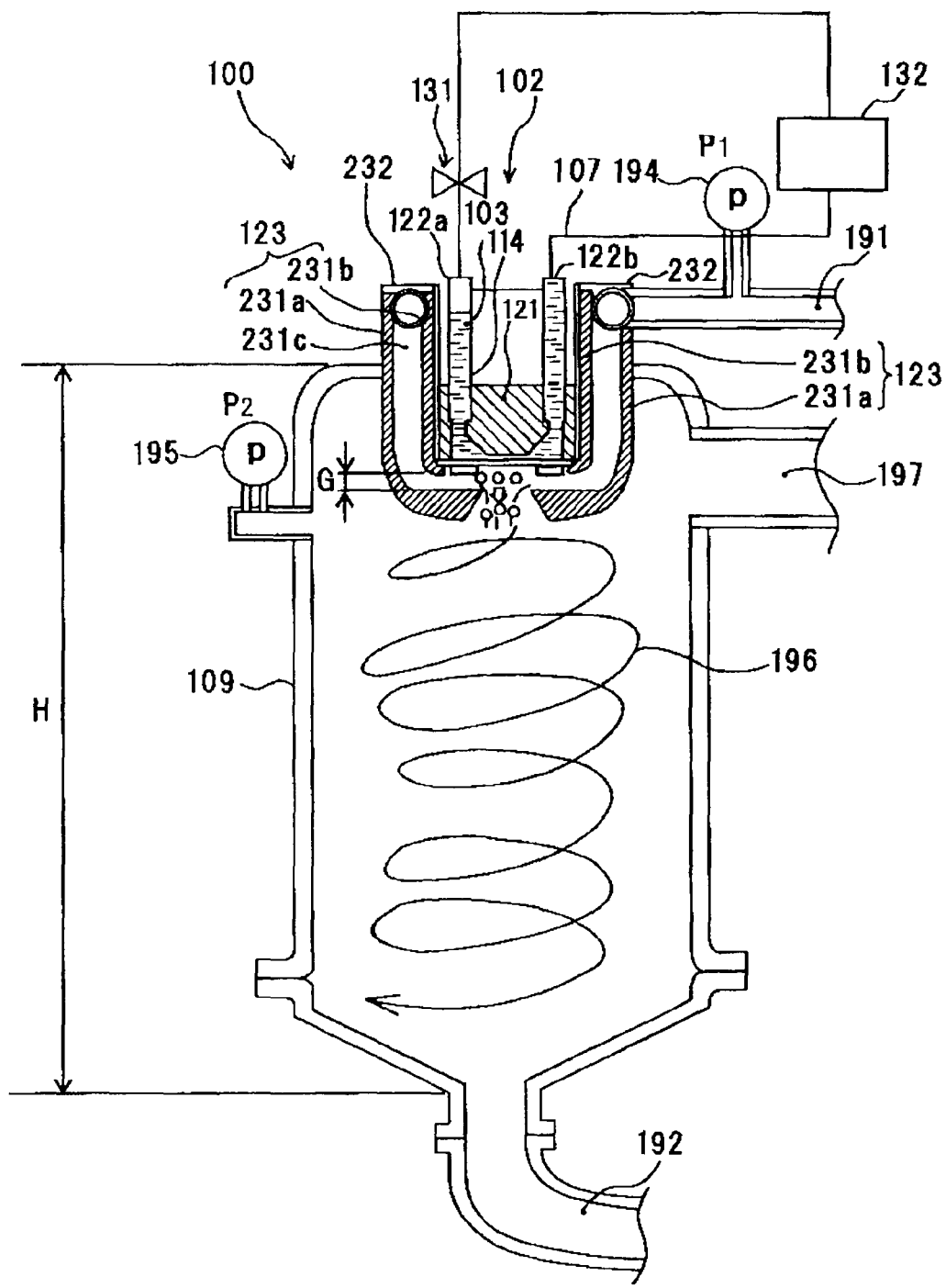
FIG. 9 is a schematic explanatory view showing an apparatus for producing a toner according to an embodiment using rotational air flow as transport air flow.

FIG. 9 is a schematic explanatory view showing an apparatus 100 for producing a toner of the present embodiment.

Figure 10:
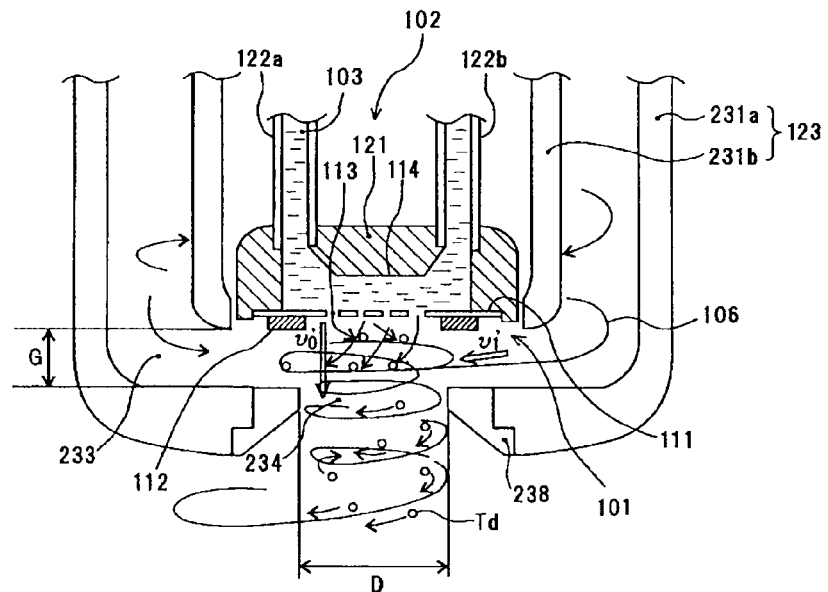
FIG. 10 is an enlarged explanatory view showing a liquid container according to an embodiment using rotational air flow as transport air flow.

The apparatus 100 for producing a toner includes a liquid container 114 for containing a toner liquid 103 obtained by dissolving or dispersing a toner material containing at least a binder resin and a pigment in a solvent, and a chamber 109 serving as a dry container which is arranged under the liquid container 114. FIG. 10 is an enlarged explanatory view of the liquid container 114 in FIG. 9, and schematically shows air flow (rotational air flow 106) and flow of toner droplets Td, which will be described later.

In a part of the lower part of the liquid container 114, a head portion 101 having a plurality of pores is provided, and the toner liquid 103 in the liquid container 114 is ejected from the pores of the head portion 101 in the form of droplets (toner droplets Td), and then the ejected droplets are dried and solidified in the chamber 109, thereby obtaining a toner. As shown in FIG. 9 and FIG. 10, the liquid container 114 having the head portion 101 in the lower part thereof, from which the toner droplets Td are ejected to a vertical downward direction.

As shown in FIG. 9 and FIG. 10, the shroud 123 is arranged outside of a container forming member 121 which constitutes the liquid container 114 for containing the toner liquid 103, so as to cover the container forming member 121 and the liquid container 114, but not to cover the head portion 101.

The shroud 123 is formed of pot-shaped double walls including an outer wall 231a and an inner wall 231b, and the liquid container 114 is arranged inside the inner wall 231b. The outer wall 231a and the inner wall 231b are formed in a cylindrical shape except the lower part thereof, and the outer wall 231a and inner wall 231b are connected with a lid 232. Both the outer wall 231a and the inner wall 231b have openings which face the head portion 101.

Figure 11:
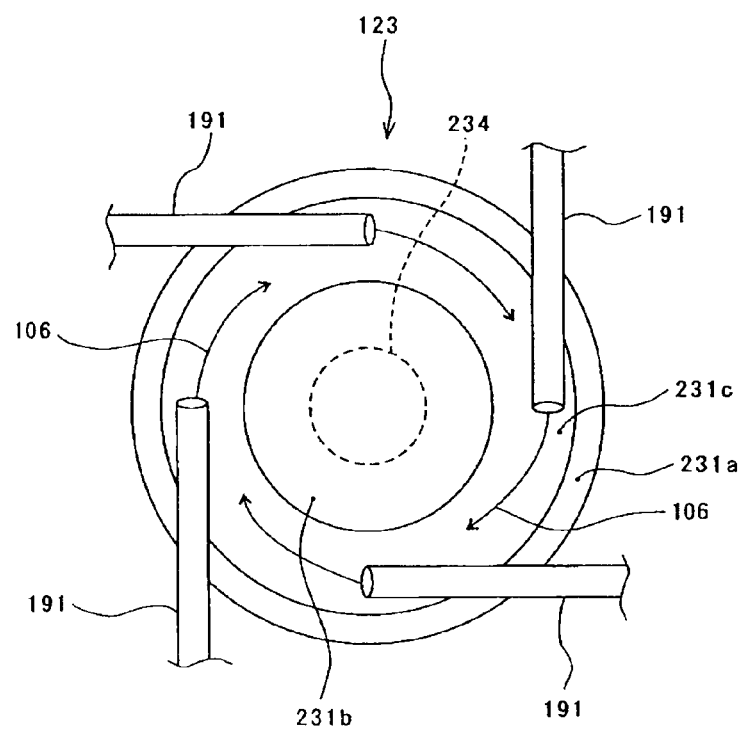
FIG. 11 is a schematic view showing a horizontal cross section near top end of a shroud according to an embodiment using rotational air flow as transport air flow.
Figure 12:
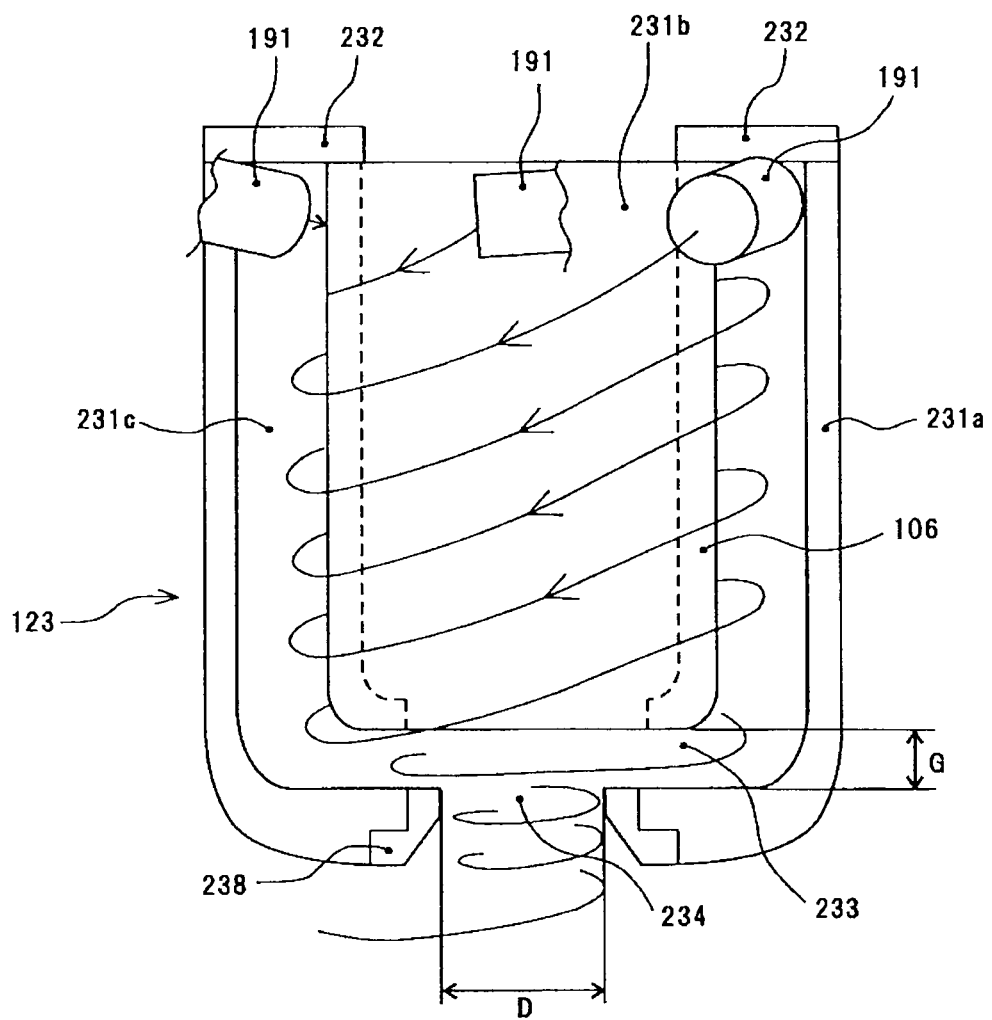
FIG. 12 is a schematic view explaining gas flow in a space between an outer wall and an inner wall of a shroud according to an embodiment using rotational air flow as transport air flow.

FIG. 11 is a schematic view showing a horizontal cross section near the top end of the shroud 123 and a little below the lid 232. FIG. 11 omits the liquid container 114 arranged in the inner wall 231b. In FIG. 10 and FIG. 11, arrows 106 represent air flow outside the liquid container 114 which will be specifically described later. FIG. 12 is a schematic view explaining air flow in a space between the outer wall 231a and inner wall 231b of the shroud 123.

As shown in FIG. 9, FIG. 11 and FIG. 12, blowoff pipes 191 for blowing air are tangentially airtightly inserted in the upper part of the side surface of the shroud 123. Openings of the ends of the blowoff pipes 191 are located in the shroud space 231c between the outer wall 231a and the inner wall 231b.

Into the shroud space 231c, gas is blown off from the pipes 191 in a tangential direction with respect to the cylindrical shaped part of the pot-shaped inner wall 231b. The gas blown from the pipes 191 passes through the shroud space 231c between the cylindrical shaped part of the inner wall 231b and the cylindrical shaped part of the outer wall 231a, so as to form spiral rotational air flow 106 as shown in FIG. 11 and FIG. 12. The spiral rotational air flow 106 includes a component orthogonal to a direction of gravity in any position of the air flow.

The inner wall 231b of the double wall of the shroud 123 extends to near the lower end of the container forming member 121. The outer wall 231a has the inwardly rounded shape and extends to the bottom of the head portion 101 so as to form a circular-shaped outer wall opening 234 located under the head portion 101. The inner surface of a bottom of the outer wall 231a of the shroud 123 and the lower end of the head portion 101 maintain a clearance 233. The width "G" of the clearance 233 is smaller than the diameter "D" of the outer wall opening 234. Thus, the width G is a main factor for deciding the flow velocity (confluent position of flow velocity $v_1$) of the rotational air flow 106 in a position where the rotational air flow 106 entrains the jetted toner droplets Td.

Figure 13A:
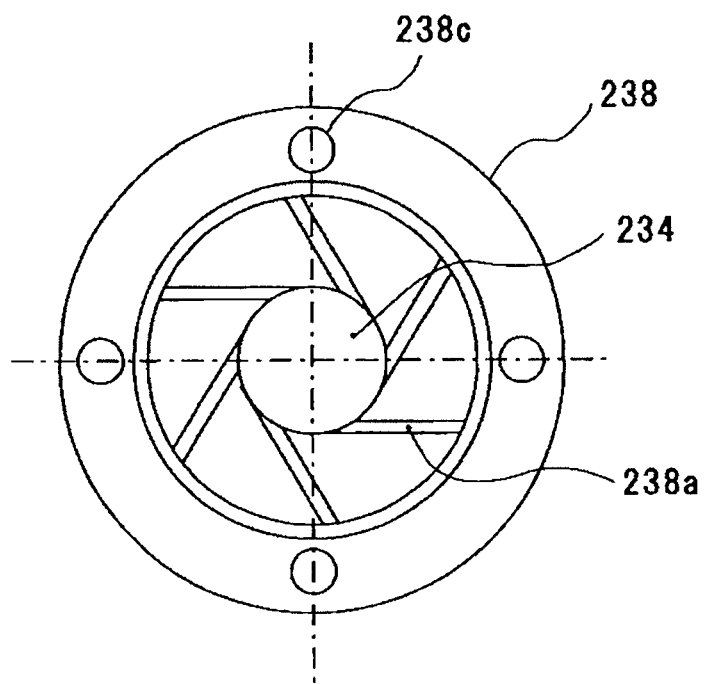
FIG. 13A is a top view explaining an opening member for forming an opening of an outer wall of a shroud according to an embodiment using rotational air flow as transport air flow.
Figure 13B:
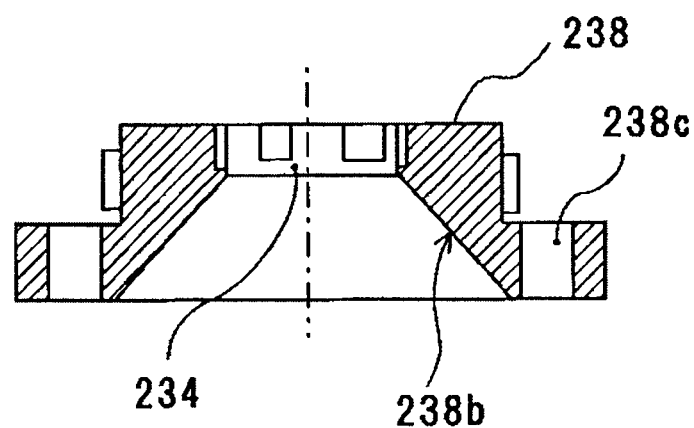
FIG. 13B is a side cross-sectional view of FIG. 13A.
Figure 13C:
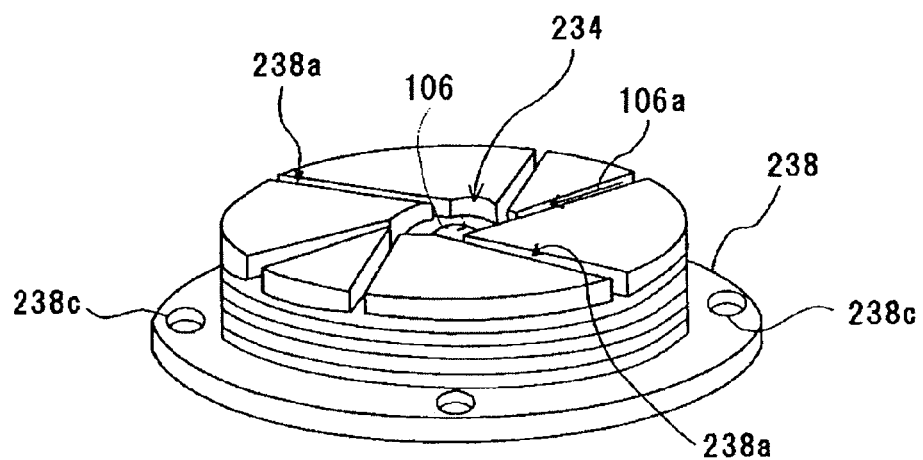
FIG. 13C is a perspective view of FIG. 13A.

FIGS. 13A to 13C are explanatory views showing an opening member 238 which is arranged in the bottom of the outer wall 231a of the shroud 123 and forms the outer wall opening 234. FIG. 13A is a top view of the opening member 238 arranged in the shroud 123 which is viewed from the upper direction. FIG. 13B is a side cross-sectional view of the opening member 238, which is viewed from the side direction. FIG. 13C is a perspective view of the opening member 238. The opening member 238 has four screw holes 238c for screwing in the bottom of the shroud 123.

As shown in FIG. 13B, a taper portion 238b is arranged so that the diameter of the opening decreases with coming closer to the outer wall opening 234 of the opening member 238. As shown in FIG. 13A and FIG. 13C, in the top surface of the opening member 238, six grooves 238a are formed so as to accelerate the formation of the rotational air flow in the outer wall opening 234. The six grooves 238a are inclined in the same direction with respect to the radial direction from the outer periphery of the top surface of the circular opening member 238 toward the outer wall opening 234 located inside. Thus, the air flow 106a passing through the grooves 238a forms the rotational air flow 106 in the outer wall opening 234.

Figure 14:
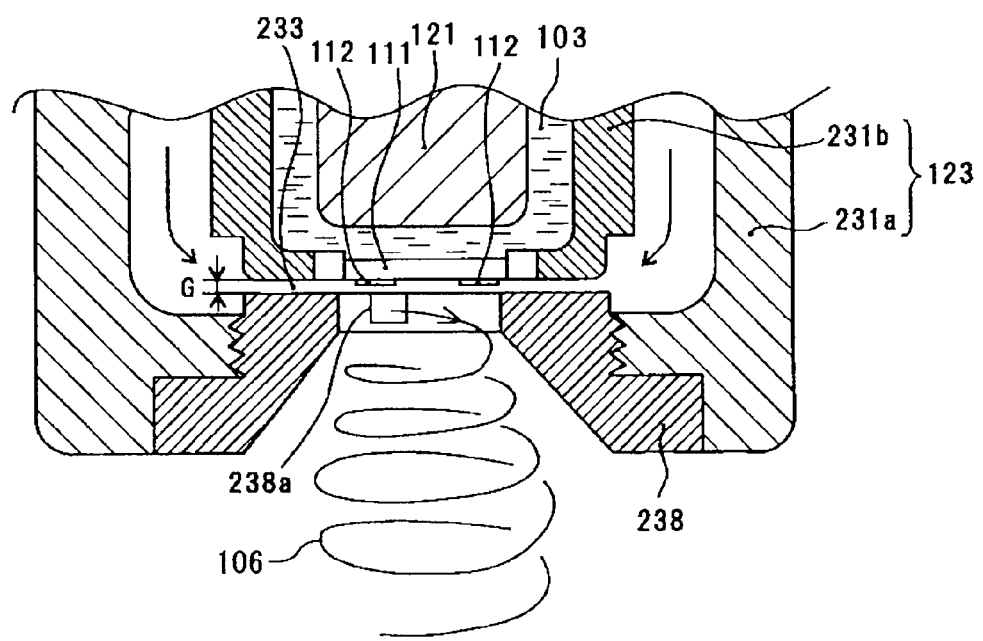
FIG. 14 is an explanatory view of the lower part of a shroud in which rotational air flow is efficiently formed in grooves of an opening member.

FIG. 14 is an explanatory view of the lower part of a shroud 123 in which rotational air flow 106 is efficiently formed in grooves 238a of an opening member 238. As shown in FIG. 14, by making the width G of a clearance 233 narrow, the proportion of the air flow passing through the grooves 238a increases in the air flow passing through the clearance 233. Therefore, the grooves 238a can accelerate the formation of the rotational air flow 106 efficiently.

Specifically, the air flow which has passed through the shroud space 231c of the shroud 123 is hard to pass though the clearance 233, because the width G of the clearance 233 between the top surface of the opening member 238 and the lower surface of the head portion 101 is narrow, and then the air flow passes through the six grooves 238a. The six grooves are arranged at substantially equal spaces and extend from the periphery of the opening member 238 to the outer wall opening 234 located in the center, so as to guide the air flow to the outer wall opening 234 in such a manner that the air flow spirally rotates with the rotation diameter gradually narrowing as the air flow coming closer to the bottom as shown in FIGS. 13A and 13C. Therefore, the air flow entering toward the outer wall opening 234 located in the central portion of the opening member 238 forms the rotational air flow 106. Specifically, the air flow 106a represented by an arrow passes through the grooves 238a in the direction shown in FIG. 13C and is formed into the rotational air flow 106. The rotational air flow 106 flows down.

As shown in FIG. 9 and FIG. 10, the liquid container 114 contains the toner liquid 103, which is obtained by dissolving or dispersing a toner material containing at least a binder resin and a pigment in a solvent. The liquid container 114 has a chamber formed by counter boring the cylindrical container formation member 121 in a circular shape, thereby constituting a toner liquid supplying part 102.

The container formation member 121 has two holes in which two guide pipes 122a and 122b are fitted and fixed. The toner liquid supplying part 102 is composed of the liquid container 114 which is composed of the container formation member 121 and the guide pipes 122a and 122b. A disc 111 is arranged on the bottom of the container formation member 121 so as to form the bottom of the liquid container 114.

The toner liquid supplying part 102 which supplies the chamber 109 with the toner liquid 103 is as explained above with reference to FIG. 9 and FIG. 10. In FIG. 9 and FIG. 10, to the guide pipe 122a located on the left side, a pipe is connected as shown in FIG. 9, and a valve 131 for controlling the flow of the toner liquid 103 is further connected thereto. The valve 131 is further connected through the pipe to the pump 132. The pump 132 is further connected through the pipe 107 to the guide pipe 122b located on the right side in FIG. 9 and FIG. 10, thereby forming the circulation path of the toner liquid 103. Upon jetting the toner liquid 103 from nozzle pores (nozzles) 113, the toner liquid 103 is jetted while circularly flowed with the valve 131 opened, or the toner liquid 103 is jetted under resting condition with the valve 131 closed.

The toner liquid 103 is jetted while circularly flowed in the apparatus 100 for producing the toner of the present invention. When the toner liquid 103 in the liquid container 114 is used up under resting condition, the valve 131 is opened to fill the toner liquid 103 therein.

The toner droplets Td jetted from the head portion 101 pass through the outer wall opening 234 of the shroud 123 and are guided to the chamber 109 having a large capacity. In FIG. 9, the spiral rotational air flow 196 flowing down is formed in the chamber 109. The toner droplets Td are entrained in the rotational air flow 196 and are transported to the guide pipe 192 connected in the bottom of the chamber 109 while the toner droplets Td are dried. The guide pipe 192 is connected to a cyclone which is a powder separator (not shown), and a toner is further transported while dried and collected in the cyclone serving as a toner collection part. In the upper side surface of the chamber 109, the pipe 197 for blowing gas in the chamber is airtightly inserted. On the surface of the chamber 109 opposite to the surface in which the pipe 197 is arranged, a pressure gage 195 for chamber is inserted. Moreover, a pressure gage 194 for pipe is inserted in a side surface of the pipe 191 for blowing gas in the shroud.

Next, the operation of the apparatus for producing a toner of the present embodiment will be explained.

When vibration is applied to the annular vibration plate 112 by a driving device (not shown), the vibration is transmitted to the disc 111 in the head portion 101 (FIGS. 3, 4A and 4B).

In the present embodiment when the vibration of 100 kHz is applied to the annular vibration plate 112, the vibration is transmitted to the disc 111 so as to vibrate the disc 111 up and down (FIG. 3). The toner liquid 103 is contained in the liquid container 114 at an appropriate pressure. The volume of the liquid container 114 is changed by deflecting the disc 111 from downward (FIG. 4A) to upward (FIG. 4B), so that the toner liquid 103 in form of the toner droplets Td is discharged, i.e. jetted (ejected) from the nozzle pores 113 to the outside. The ejection frequency of the toner droplets Td is identical with the vibration frequency of the disc 111. The toner droplets Td jetted from the nozzle pores 113 flow together with the rotational air flow 106 formed in such a manner that the air flow passes through the shroud space 231c, and the toner droplets Td are entrained in the rotational air flow 106 and flow down along the spiral track as shown in FIG. 10. The flow velocity of the rotational air flow 106 at the position where the toner droplets Td are jetted is defined as a flow velocity $v_1'$ at a confluence point.

Figure 6:
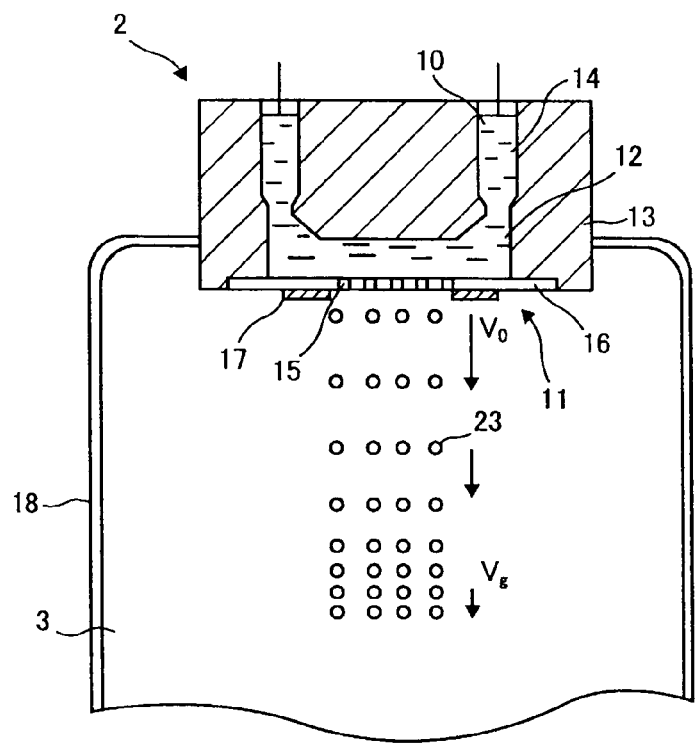
FIG. 6 is a schematic view showing an example of a droplet jetting unit of a conventional apparatus for producing a toner.
Figure 7A:
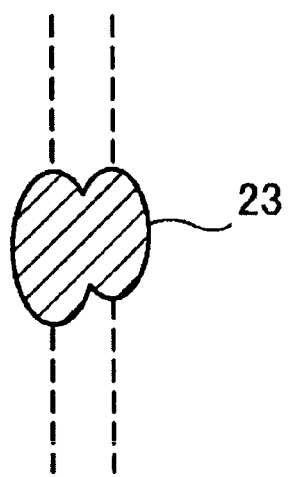
FIG. 7A is a view showing a cross-sectional shape of an aggregated toner particle formed by a conventional apparatus for producing a toner, in the case of aggregation of two droplets.
Figure 7B:
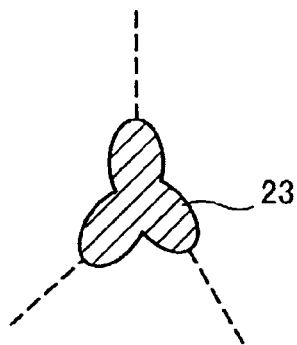
FIG. 7B is a view showing a cross-sectional shape of an aggregated toner particle formed by a conventional apparatus for producing a toner, in the case of aggregation of three droplets.
Figure 8:
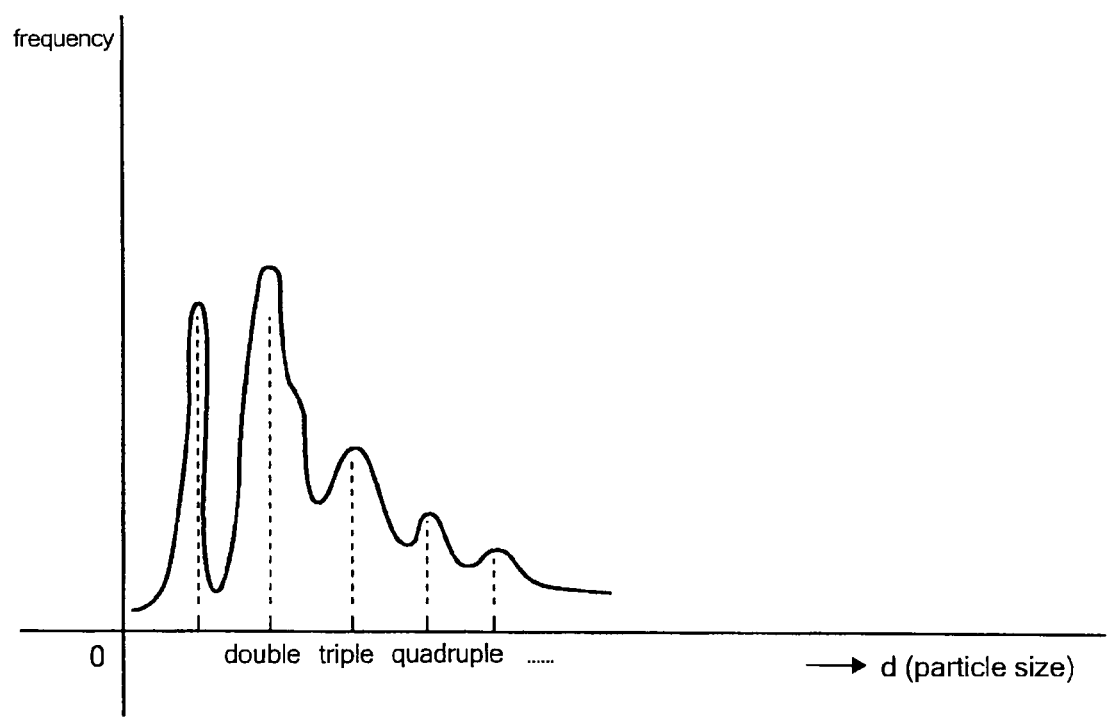
FIG. 8 is a graph showing a particle size distribution of a toner formed by a conventional apparatus for producing a toner.

Here, when the rotational air flow 106 is not formed, the jetted toner droplets Td are decelerated by the resistance of air viscosity, and counterbalanced at terminal velocity, occurring aggregation (FIG. 6). The flow velocity $v_1'$ at the confluence point is larger than the terminal velocity, and set as large as to keep enough distance between the toner droplet Td jetted earlier and the toner droplet Td jetted later, in view of the variations of particle diameters and initial velocities of the toner droplets Td.

The terminal velocity is calculated by Equation (1).

$$\text{Terminal velocity} = [\{4g \cdot Dp \cdot (\rho p - \rho f)\}/(3\rho f \cdot Cr)]^{1/2} \quad \text{Equation (1)}$$

In Equation (1), "g" represents an acceleration of gravity, Dp represents a particle diameter of a droplet, ρp represents a density of gas, ρf represents a density of the droplet, and Cr represents a coefficient of resistance (dimensionless number).

According to the present embodiment, the toner droplets Td jetted from the head portion 101 have substantially the same size, and have a spherical shape because of the surface tension of the droplets. Therefore, the droplets do not have different terminal velocities, but the same terminal velocity.

Specifically, according to the present embodiment, the toner droplet Td jetted from the head portion 101 has a diameter of 12 μm and a terminal velocity of $4.1 \times 10^{-3}$ m/sec, being an extremely small value. The direction of the rotational air flow 106 is formed by air flow containing a component orthogonal to a direction of gravity, and the flow velocity $v_1'$ at the confluence point of the rotational air flow 106 is set faster than the terminal velocity, thereby more certainly preventing the toner droplets Td from aggregation.

The track of the toner droplets Td entrained in the rotational air flow 106 is corrected in the transport air flow, and the toner droplets Td flow down at the velocity equal to that of the rotational air flow 106. Thus, turbulent flow is formed, and the jetted droplets do not aggregate and are dried and collected. In view of preventing the droplets from aggregation, the flow velocity $v_1'$ of the rotational air flow 106 is preferably larger than the initial velocity $v_0'$.

When the air flow for entraining the jetted toner droplets Td is not the rotational air flow 106 but laminar flow, a considerably large amount of gas is necessary to be charged in the shroud in order to satisfy the relation: $v_1' > v_0'$. The rotational air flow 106 enables to reduce the amount of gas down to one-tenth of the amount of the gas required for the laminar flow.

On the other hand, gas is blown into the shroud 123 from the blowoff pipe 191, and the blown air flow passes through the shroud so as to form the rotational air flow 106 and is discharged from the outer wall opening 234 to the chamber 109. The rotational air flow 106 is as shown in FIG. 12; air flow rotating in a circumferential direction is generated uniformly downwardly, and then changed to flow smoothly in a lateral direction because the lower end of the outer wall 231a of the shroud is rounded. Then the rotational air flow 106 meets with the toner droplets Td under the head portion 101, and is discharged from the outer wall opening 234.

According to the apparatus 100 for forming a toner of the present invention, by forming the rotational air flow 106 in a position where the toner droplets Td are jetted from the head portion 101, the jetted toner droplets Td are not decelerated as in the conventional example explained with reference to FIG. 6, and entrained in the rotational air flow 106 so as to be ejected from the outer wall opening 234 into the chamber 109. Further, the droplets entrained in the rotational air flow 196 in the chamber and transported to the collecting part without forming aggregation.

In the apparatus 100 for forming a toner of the present embodiment, the flow velocity $v_1'$ at the confluence point of the rotational air flow 106 is larger than the initial velocity $v_0$, and the movement of the toner droplets Td are accelerated when being entrained in the rotational air flow 106 and then the toner droplets Td are transported while entrained in the rotational air flow 196 in the chamber. The larger flow velocity of the rotational air flow 106 is preferably used to prevent the droplets from aggregation. The air flow in the chamber 109 is uniformly formed in a circumferential direction by blowing gas off from the blowoff pipe 197 in the chamber, just like in the shroud 123. In the chamber 109, turbulent flow is preferred in order to enhance drying capability. In order to smoothly flow down the rotational air flow 106 even when the rotational air flow 106 having a flow velocity $v_1$ including the toner droplets Td ejected in the chamber 109 becomes turbulent flow, the flow velocity $v_1$ of the rotational air flow 106 and the flow velocity $v_2'$ in the chamber 109 preferably satisfy the relation: $v_2'\geq v_1'$.

The flow velocity in the shroud 123 and that in the chamber 109 are controlled by the pressure gauges. When the pressure in the shroud 123 and that in the chamber 109 are respectively defined as P1 and P2, P1 and P2 preferably satisfy the relation: P1≥P2. If this relation is not maintained, the toner droplets Td may possibly flow back from the chamber 109 to the shroud 123.

As described above, the factor for deciding the flow velocity $v_1'$ at the confluence point, which is the flow velocity of the rotational air flow 106 at the confluence point where the rotational air flow 106 entrains the toner droplets Td in the shroud 123 is the relation between the diameter D of the outer wall opening 234 and the width G of the clearance 233 which satisfies D>G. Moreover, other factors for deciding the flow velocity $v_1'$ at the confluence point are the opening member 238 having the groove 238*a*, and the width G of the clearance 233 between the outer wall 231*a* and the head portion 101 which has been explained with reference to FIGS. 13A to 13C.

In the apparatus 100 for producing a toner of the present embodiment, the rotational air flow 106 in the shroud 123 and the rotational air flow 196 in the chamber 109 are formed by blowing gas from the blowoff pipes 191 and 197 respectively arranged in the upper part thereof. Alternatively, the air flow may be formed by a suction pipe arranged at the bottom part of the chamber 109.

The cross-sectional outer wall opening 234 which is an opening for the outer wall 231*a* of the shroud 123 preferably has a taper of which diameter increases outwardly as shown in FIG. 13B. When the toner droplets Td pass through the outer wall opening 234, the taper can prevent toner droplets Td from being in contact with and adhering to the wall surface.

The size of the main part of the apparatus 100 for producing a toner of the present embodiment is as follows:

The container formation member 121 has an outer diameter of 23 mm, and a height of 10 mm. The toner liquid supplying part 102 has a height of 54 mm. The guide pipes 122*a* and 122*b* have an inner diameter of 4 mm. The disc 111 is a nickel plate having a diameter of 12 mm and a thickness of 20 mm. A plurality of nozzle pores 113 have a diameter of 10 mm, and 800 nozzle pores are formed in a central area having a diameter of 5 mm of the disc 111. The shroud 123 has an inner wall 231*b* having an outer diameter of 22 mm, an outer wall 231*a* having an outer diameter of 36 mm, and a height of 55 mm. The clearance 233 has a width "G" of 3 mm, and the opening having a diameter of 9 mm. The blowoff pipe 191 of the shroud 123 has an inner diameter of 6 mm. The chamber 109 has an inner diameter of 74 mm, and has a height "H" shown in FIG. 9 of 160 mm. The blowoff pipe 197 in the chamber has an inner diameter of 12 mm. In the apparatus 100 for producing a toner, the amount of blowing gas from the pipe 197 in the chamber is 1.5 g/min. The pressure P1 of the shroud 123 is 17 kPa, and the pressure P2 of the chamber is 15 kPa. The initial velocity $v_0$ of the toner droplets Td is 8 m/s, and the flow velocity $v_1'$ of the rotational air flow 106 at the confluence point is 35 m/s. The temperature inside the chamber 109 is 27° C. to 28° C.

The explanation of other configurations is omitted, because the configurations of the first embodiment can be applied to the second embodiment.

EXAMPLES

Hereinafter, the preparation of a toner composition used in the present invention will be explained on the basis of the examples, which however shall not be construed as limiting the scope of the present invention. All percentages and parts are based on mass unless indicated otherwise.

Example 1

—Preparation of Colorant Dispersion Liquid—

Firstly, as a colorant, a dispersion liquid of carbon black was prepared.

Specifically, 17 parts of carbon black (REGAL 400, manufactured by Cabot Corp.) and 3 parts of a pigment dispersant were added to 80 parts of ethyl acetate, and primarily dispersed using a mixer having a stirring blade to obtain a primary dispersion liquid. As the pigment dispersant, AJISPER PB821 (manufactured by Ajinomoto Fine-Techno Co., Inc.) was used. The obtained primary dispersion liquid was finely dispersed under strong shearing force using a DYNO MILL to prepare a secondary dispersion liquid in which aggregates having a size of 5 μm or more were completely removed.

—Preparation of Wax Dispersion Liquid—

Next, a wax dispersion liquid was prepared.

Specifically, 18 parts of a carnauba wax and 2 parts of a wax dispersant were added to 80 parts of ethyl acetate and primarily dispersed using a mixer having a stirring blade to prepare a primary dispersion liquid. The primary dispersion liquid was heated to 80° C. with stirring to dissolve the carnauba wax therein, and then the temperature of the primary dispersion liquid was decreased to room temperature to precipitate wax particles so as to have a maximum diameter of 3 μm or less. As the wax dispersant, the one prepared by grafting a styrene-butyl acrylate copolymer on a polyethylene wax was used. The obtained dispersion liquid was further finely dispersed under strong shearing force using a DYNO MILL so as to prepare a wax dispersion liquid having a maximum diameter of 2 μm or less.

—Preparation of Toner Composition—

Next, a toner composition dispersion liquid, in which a binder resin, the colorant dispersion liquid and the wax dispersion liquid were added, composed of the following composition was prepared.

Specifically, 100 parts of polyester resin as a binder resin, 30 parts of the colorant dispersion liquid, 30 parts of the wax dispersion liquid, and 840 parts of ethyl acetate were stirred for 10 minutes using a mixer having a stirring blade so as to be uniformly dispersed. The pigment or wax particles were not aggregated by solvent dilution.

Such toner composition liquid was used in the apparatus 1 for producing a toner (an apparatus for producing a toner using vertical downward air flow) as shown in FIG. 5 so as to prepare toner particles. The dried and solidified toner particles were suction collected by a filter having a pore size of 1 μm, thereby obtaining a toner of Example 1. The particle size distribution of the toner was measured by means of a flow particle image analyzer FPIA-2000. The toner had a mass average particle diameter (D4) of 5.5 μm, a number average particle diameter (Dn) of 5.2 μm, and an average ratio of D4/Dn of 1.05. The toner (100 parts) and 0.5 parts of a hydrophobic silica H-2000 as an external additive were mixed by HENSCHEL MIXER, so as to obtain a final toner.

Next, a carrier was produced by the following method.

Core: spherical ferrite particles having an average particle diameter of 50 μm

Coating material: a silicone resin

The silicone resin was dispersed in toluene so as to prepare a dispersion liquid. The dispersion liquid was spray coated on the core under heating condition, fired, and cooled so as to produce a carrier particle coated with a resin film having an average thickness of 0.2 μm.

The final toner (5 parts) were added to and mixed in 100 parts of the carrier so as to obtain a developer.

An image was formed using the developer by a commercially available copier, IMAGIO NEO 450 (manufactured by Ricoh Company, Ltd.), thereby obtaining an image having a sufficient image density and sharpness.

Comparative Example 1

A toner of Comparative Example 1 was obtained in the same manner as in Example 1 by jetting droplets under the conditions of the same toner composition, the droplet jetting unit 2, the chamber 18 and the like, except that the shroud 30 was not provided. The particle size distribution of the toner was measured in the same manner as in Example 1. The toner of Comparative Example 1 had a mass average particle diameter (D4) of 5.9 μm and a number average particle diameter (Dn) of 5.4 μm, and an average ratio of D4/Dn of 1.09. The toner of Comparative Example 1 was compared with the toner of Example 1 as follows:

The aggregation of toners was evaluated using a plurality of samples of toners respectively obtained by the method for producing a toner of Example 1 and the method for producing a toner of Comparative Example 1. The evaluation was based on the occupancy of so-called toner having a large particle diameter, namely, a particle diameter of 12.7 μm or more. The occupancy was obtained by measuring a particle size distribution using COULTER COUNTER MULTISIZER III, manufactured by Beckman Coulter Inc. The so-called toner having a large particle diameter, i.e. a particle diameter of 12.7 μm or more, has been known that it is inconvenient for use. As a result of measurement, the occupancy of the particle diameter of 12.7 μm or more in the toner of Comparative Example 1 was 30% to 40%, while that in the toner of Example 1 was 3% to 5%, being outstandingly low. As is clear from the result, the aggregation of droplets was outstandingly decreased by using the toner obtained by the method for producing a toner of Example 1 of the present invention.

Example 2

A toner of Example 2 was produced in the same manner as in Example 1, except that the apparatus 1 for producing a toner shown in FIG. 5 (the apparatus for producing a toner using vertical downward air flow) was replaced with the apparatus 100 for producing a toner shown in FIG. 9 (the apparatus for producing a toner using rotational air flow).

As a result of measuring the particle size distribution of the toner of Example 2 in the same manner as in Example 1, the occupancy of the particle diameter of 12.7 μm or more in the toner of Example 2 was 0.5% to 4%, being outstandingly low.

Thus, it is understood that the aggregation was outstandingly decreased by generating the rotational air flow as in the apparatus 100 for producing a toner of the present embodiment.

In the apparatus 100 for producing a toner, gas is flowed in a shroud space 231c between an outer wall 231a and an inner wall 231b in a shroud 123, so as to generate rotational air flow 106. The configuration of generating the rotational air flow is not particularly limited as long as the rotational air flow for entraining the toner droplets Td jetted from a head portion 101 can be generated. The configuration is not limited to those using the shroud 123.

As stated above, in the apparatus 100 for producing a toner of the second embodiment, a toner liquid 103, which is a solution and/or dispersion obtained by dissolving or dispersing a toner material containing at least a binder resin and a pigment in a solvent, is contained in a liquid container 114 equipped with a head portion 101 having a plurality of nozzle pores 113, and the toner liquid 103 in the liquid container 114 is jetted from the head portion 101 so as to form toner droplets Td, and the jetted toner droplets Td entrained in the rotational air flow 106 and are dried and solidified so as to obtain a toner. In the case where the jetted toner droplets Td are entrained in the rotational air flow 106, when the particle diameters and shapes of the toner droplets Td vary, the velocity changes and influence from the gravity are varied depending on how viscous resistance of the gas affects the toner droplets Td of different sizes and shapes, and thus the toner droplets Td falling down with slow deceleration and the toner droplets Td falling down with fast deceleration take different tracks. Therefore, the toner droplet Td jetted later falling down at high velocity with slow deceleration is not easily brought into contact with the toner droplet Td jetted earlier. Each of the jetted toner droplets Td falls down while entrained in the rotational air flow 106, so that each of the toner droplets Td moves with the surrounding gas, and the viscous resistance of the gas against the toner droplets Td is decreased, reducing deceleration. Thus, the toner droplet Td jetted later is hard to catch up with the toner droplet Td jetted earlier, and the toner droplet Td jetted later is not easily brought into contact with the toner droplet Td jetted earlier. As for the toner droplets Td entrained in the rotational air flow 106, in the state where one toner droplet Td is in contact with another toner droplet Td, the moving direction of the one toner droplet Td is not the same as a direction where another toner droplet Td is positioned in most cases. Thus, even if the toner droplets Td are brought into contact with each other, they do not easily aggregate, compared to those in the conventional art. In the apparatus 100 for producing a toner of the present embodiment, the jetted toner droplets Td are not easily brought into contact with each other, and even if they are in contact with each other, they do not easily aggregate. Therefore, it is possible to prevent the toner droplets Td from aggregation during production of a toner, and the toner having a sharp particle size distribution can be produced.

In the apparatus 100 for producing a toner, the flow velocity $v_1'$ of the rotational air flow 106 at the confluence point is set faster than the terminal velocity of the toner droplets Td. Thus, the toner droplets Td can be certainly prevented from contacting therebetween, and can also be prevented from aggregation.

In the apparatus 100 for producing a toner, the shroud 123 which covers an area other than the head portion having a plurality of nozzle pores 113 is provided outside the liquid container 114, and the rotational air flow 106 is obtained by flowing gas in the shroud space 231c between the outer wall 231a and the inner wall 231b of the shroud 123. The rotational air flow 106 can be generated by providing such shroud 123.

In the apparatus 100 for producing a toner, the rotational air flow 106 is obtained by blowing gas from a blowoff pipe 191 arranged in the upper part inside the shroud 123. Thus, by blowing gas off in the upper part of the shroud 123, the gas passes through the cylindrical shroud space 231c so as to form the rotational air flow 106. Even if the gas is introduced in the shroud space 231c by other methods, it is difficult to efficiently form the rotational air flow 106 in the same manner as in the apparatus 100 for producing a toner of the present embodiment.

In the apparatus 100 for producing a toner, the rotational air flow 106 is obtained by blowing gas off from the pipe 191 in a tangential direction with respect to the inner wall 231b of the shroud 123. The rotational air flow 106 is generated by blowing off gas from the pipe 191 in the tangential direction. When the air flow is generated in directions other than the tangential direction, the air flow strikes on the inner wall 231b or the outer wall 231a of the shroud 123 so as to form turbulent flow. Thus, it is difficult to efficiently form the rotational air flow 106 in the same manner as in the apparatus 100 for producing a toner of the present invention.

In the apparatus 100 for producing a toner, the shroud 123 having the outer wall opening 234 in a position corresponding to a plurality of nozzle pores 113, and in which a taper is arranged so that its diameter increases with distance from the outer wall opening 234.

Thus, the space density of the toner droplets Td ejected from an outlet of the shroud 123 can be decreased. That is, in the case of the large particle density, the droplets aggregate to some extend during drying even in the rotational air flow 106, and the effect of preventing droplets from aggregation is decreased. By contrast, the taper can enhance the effect of aggregation prevention obtained by generating the rotational air flow 106, as much as possible.

Moreover, unlike the apparatus 100 for producing a toner of the present embodiment, an apparatus may have a chamber 109 which is a dry container for containing and drying the jetted toner droplets Td, and may be configured to obtain the rotational air flow 106 by suctioning gas from a suction pipe arranged at the bottom of the chamber 109. Furthermore, the configuration of blowing gas off from the blowoff pipe 191 and the pipe 197 in the chamber, and the configuration of suctioning gas from a suction pipe arranged under the chamber 109 may be combined. Thus, the toner droplets Td ejected from the outer wall opening 234 serving as the outlet of the shroud 123 can be effectively dried. That is, air flow can be generated so as to fall straightly down the toner droplets Td with rotating, while they are entrained in the rotational air flow 106, just like a spray dry method. Thus, the toner droplets Td are rapidly dried to be a toner.

What is claimed is:

1. A method for producing a toner, comprising:
   ejecting a toner composition liquid containing at least a resin and a colorant periodically from a plurality of nozzles into a chamber using a vibration unit, so as to form droplets in a gas phase; and
   solidifying the droplets, wherein
   the droplets are transported by a transport air flow which is a rotational air flow,
   the transport air flow is obtained by flowing a gas in a shroud arranged covering the nozzles,
   the shroud has an opening positioned under and facing the nozzles, the shroud including an inner wall and an outer wall connected together with a lid, the inner wall extending near a lower end of a container of the toner composition liquid and the outer wall having an inwardly round shape and extending to a position under the nozzles such that a bottom of the outer wall presents the opening facing the nozzles,
   the rotational air flow is obtained by generating air flow in a tangential direction with respect to the inner wall of the shroud, and
   a diameter of the opening is greater than a clearance between an inner surface of the bottom of the outer wall and a lower end of the nozzles.

2. The method for producing a toner according to claim 1, wherein the rotational air flow comprises a component orthogonal to a direction of gravity in any position of the air flow direction.

3. The method for producing a toner according to claim 2, wherein a flow velocity of the rotational air flow is larger than a terminal velocity of the droplets, which is calculated by Equation (1):

$$\text{Terminal velocity} = [\{4g \cdot Dp \cdot (\rho p - \rho f)\}/(3\rho f \cdot Cr)]^{1/2} \quad \text{Equation (1)}$$

where "g" represents an acceleration of gravity, Dp represents a particle diameter of a droplet, ρp represents a density of gas, ρf represents a density of the droplet, and Cr represents a coefficient of resistance which is a dimensionless number.

4. The method for producing a toner according to claim 1, wherein the transport air flow is obtained by blowing the gas off from an upper part of the shroud.

5. The method for producing a toner according to claim 1, wherein the transport air flow is generated by suctioning the gas using a suction unit arranged in a lower part of the chamber.

6. An apparatus for producing a toner according to the method of claim 1, comprising:
   a droplet forming unit configured to jet a toner composition liquid containing at least a resin and a colorant from a plurality of nozzles, which is vibrated at a constant frequency, into a chamber so as to form droplets;
   a toner particle forming unit configured to dry the droplets by removing a solvent therein so as to form toner particles; and
   a shroud configured to form transport air flow for transporting the droplets formed of the toner composition liquid flowing along a direction of ejecting the toner composition liquid from the nozzles, and the transport air flow is selected from at least one of vertical downward air flow and rotational air flow.

7. The apparatus for producing a toner according to claim 6, further comprising a vertical downward air flow generating unit configured to generate the vertical downward air flow with respect to the ejected droplets, wherein the vertical downward air flow has a flow velocity larger than the free fall velocity of the droplets.

8. The apparatus for producing a toner according to claim 6, further comprising a rotational air flow generating unit configured to generate the rotational air flow with respect to the ejected droplets, wherein the rotational air flow comprises a component orthogonal to a direction of gravity in any position of the air flow direction.

9. The apparatus for producing a toner according to claim 6, wherein the shroud has an opening in a position corresponding to the nozzles, and the cross-sectional opening has a taper of which diameter increases outwardly.

10. The method for producing a toner according to claim 1, further comprising:
    providing a second air flow to the chamber,
    wherein at least a portion of the shroud separates the second air flow from the transport air flow.

11. The method for producing a toner according to claim 10, wherein a velocity of the second air flow is greater than a velocity of the transport air flow downstream of the shroud.

12. The method for producing a toner according to claim 10, wherein the second air flow is a laminar flow.

13. The method for producing a toner according to claim 1, wherein a pressure in the shroud is greater than or equal to a pressure in the chamber.

14. The method for producing a toner according to claim 1, wherein the shroud has an opening in a position corresponding to the nozzles, and a cross-section of the opening has a taper of which diameter increases outwardly.

* * * * *